June 14, 1966  D. J. HOWLES  3,256,052
ROLLER BEARING CAGE WITH ROLLER RETAINERS
Filed Dec. 4, 1963  2 Sheets-Sheet 2
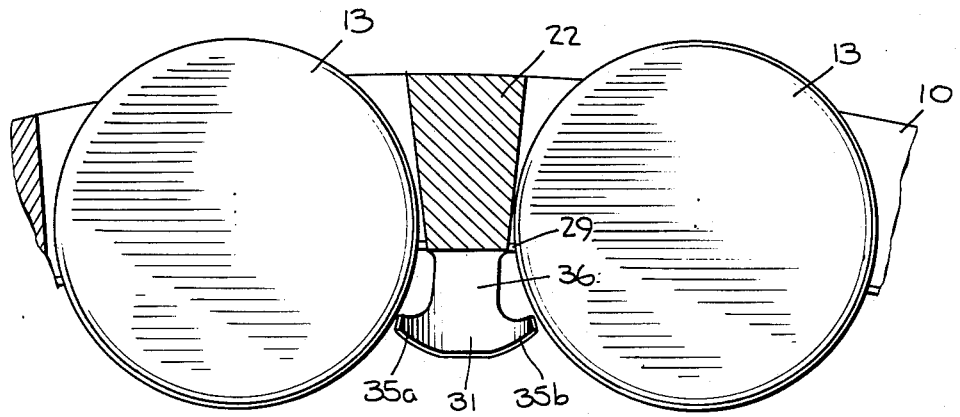
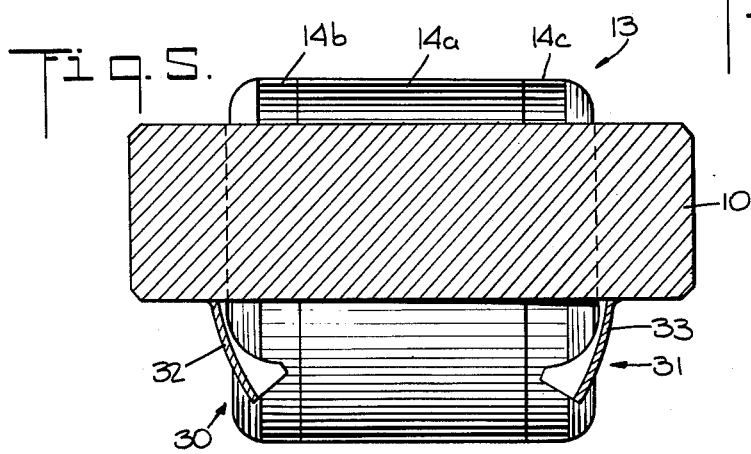
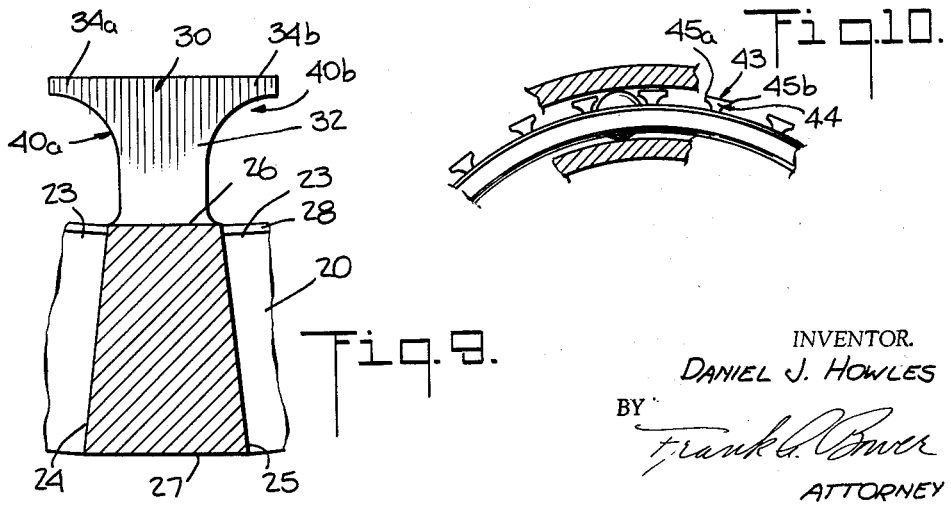
INVENTOR.
DANIEL J. HOWLES
BY
Frank G. Bower
ATTORNEY

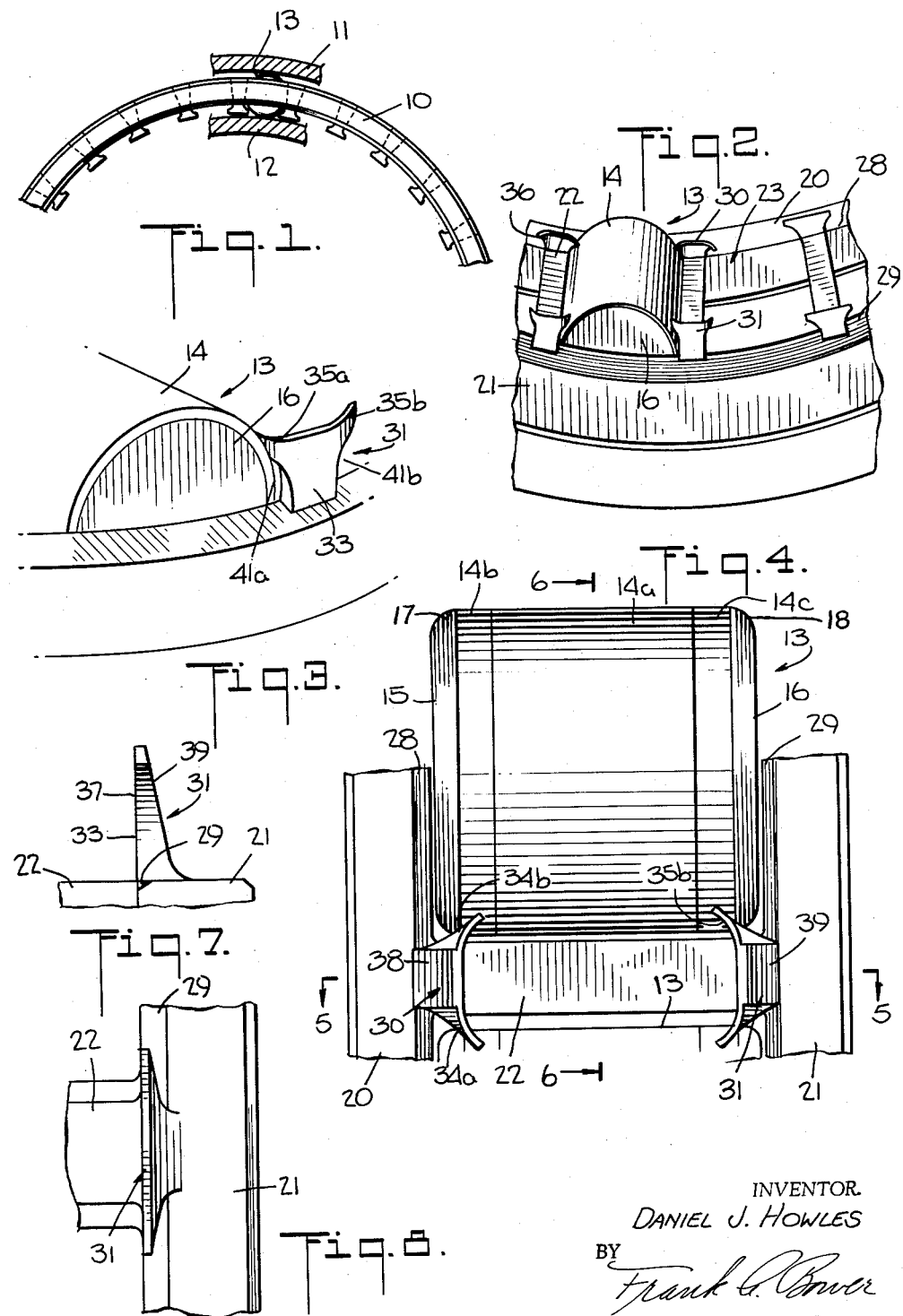

United States Patent Office 3,256,052
Patented June 14, 1966

3,256,052
ROLLER BEARING CAGE WITH ROLLER RETAINERS
Daniel J. Howles, Jamestown, N.Y., assignor, by mesne assignments, to TRW Inc., a corporation of Ohio
Filed Dec. 4, 1963, Ser. No. 327,940
6 Claims. (Cl. 308—217)

This invention relates to the cages of roller bearings and the method of assembly of the bearings with the cages and rollers.

In the manufacture of roller bearings the rollers are fitted in the cage spacing the rollers with either the inner or outer ring positioned concentric to the cage. The assembly of the inner or outer ring with the roller bearing cage is then either shipped for later assembly with the other ring or assembled immediately thereafter. In either case, means are required to hold the rollers in the cage until the assembly of the bearing is completed. Various means have been provided to retain the rollers in the cage during this intermediate period. The standard means has been the bending of a projection extending from the webbed section of the cage over the roller after insertion.

This previous means was satisfactory since the cages were made of a malleable metal which permitted the projection of lugs to be readily bent over the roller without breaking or cracking the lug. However, for severer operating conditions other metals are required which do not have the malleability of the metals usually used. As a result, the lugs crack and break rendering the bearing unsatisfactory. In view of the large number of lugs on a cage, this is a serious problem and causes rejection of otherwise acceptable bearings or failure of the bearing under operating conditions.

An object of the invention is to provide roller bearing cages made of metal having a low percentage of elongation with retaining means that are formed as part of the cage and may be bent into a roller retaining position without breaking or cracking.

Another object of the invention is to provide a roller bearing cage with retaining means that do not distort the cage on bending into roller retaining position.

Another object of the invention is to provide a roller bearing cage made of metal having a low percentage of elongation that is easily assembled and has roller retaining means that can be inexpensively and easily positioned to retain the rollers in the cage.

Another object of the invention is to provide a roller bearing cage with roller retaining means that may be easily inspected for defects.

Other and further objects and advantages will be apparent from the following description taken in connection with the drawings in which FIG. 1 is a fragmentary side view of a complete bearing;

FIG. 2 is a fragmentary perspective view of a partially assembled outer race and cage;

FIG. 3 is an enlarged fragmentary perspective view illustrating the relation of the roller and retainer means;

FIG. 4 is a fragmentary plan view of a roller and cage with the retainer means bent into position;

FIG. 5 is a sectional view of FIG. 4 taken along lines 5—5;

FIG. 6 is a sectional view of FIG. 4 taken along lines 6—6;

FIG. 7 is a fragmentary side view of the unbent retaining means;

FIG. 8 is a top view of the unbent retaining means;

FIG. 9 is a front view of one of the unbent retaining means; and

FIG. 10 illustrates a cage with outwardly extending retaining means.

Referring to FIG. 1 of the drawings a fragmentary view of a bearing is illustrated with a cage 10 between an outer ring 11 and an inner ring 12. The cage has rollers 13 engaging the inner and outer rings 11 and 12. The rings and rollers may be of conventional type. The rollers have a cylindrical surface 14 and flat end surfaces 15 and 16. The edges of the rollers have rounded surfaces 17 and 18 between the side surfaces 15 and 16 and the cylindrical surface 14. The surface portion 14a centrally positioned on the roller is the working surface or bearing surface engaging the inner and outer rings for transmission of loads. The surfaces 14b and 14c are non-working surfaces of the cylindrical surface 14.

The cage 10 may be of a metal having a very low percentage of elongation or low malleability and is formed in a single piece. The cage has circumferentially extending ring portions 20 and 21 and web portions 22 evenly distributed around the cage to form equally sized spaces or apertures 23 for receiving the rollers 13. Each of the webs has flat radial surfaces 24 and 25 and slightly curved inner and outer surfaces 26 and 27 which impart a generally trapezoidal cross-sectional shape to the webs 22. Roller retaining means or lugs 30 and 31 are machined as part of the cage and are attached or extend from the circumferentially extending ring portions 20 and 21 adjacent opposite ends of each of the web portions 22. The circumferentially extending ring portions 20 and 21 have slightly beveled inner surfaces 28 and 29 which are approximately the same width as the thickness of the lugs 30 and 31 at the ring portions.

The lugs 30 and 31 are initially formed to extend perpendicular or normal to the respective ring portions 20 and 21 and have stems 32 and 33 and fingers 34a, 34b, 35a, 35b. The facing surfaces 36 and 37 of the lugs are initially flat and extend parallel to one another along radial planes. The outwardly or oppositely facing surfaces 38, 39 are sloped at approximately a 10° angle to taper the lugs 30 and 31 so as to be narrower at the tip end than at the ring portion end. The fingers 34a, 34b, 35a, 35b extend circumferentially from the tip end of the stem, thereby forming notches 40a, 40b and 41a, 41b on opposite edges of the lugs 30 and 31, respectively, to taper the fingers. Thus the lugs project radially away from the ring portions and then project circumferentially a radial distance from the ring portions with the radial portion tapered longitudinally of the cage to reduce the thickness away from the ring portion and the circumferential extending portions having a reduced width towards the engaging ends to provide a taper thereto.

The bearing may be assembled in a conventional manner with the outer ring firmly supported in a jig or other suitable fixture holding means (not shown) and the cage fitted therein. The rollers 13 are then inserted in the spaces 23 and the lugs 30 and 31 are bent into a retaining position described later herein. When all of the rollers are in place, the partially assembled bearing is then removed and the inner ring inserted in a conventional manner.

With two rollers 13 in adjacent spaces 23, the stems 32 and 33 of the lugs are bent inwardly and the fingers 34a, 34b are also bent or curled inwardly so that the ends of the fingers 34a, 34b overlap with the non-working surfaces 14b and the tips of the fingers 35a, 35b overlap with the non-working surfaces 14c. This bending may be produced by two mandrels moving inwardly on opposite sides of the cage. The combination of the stem and fingers provides for a compound bending of the lug which substantially reduces the amount that any portion of the lug is required to be bent to the desired retaining position. This substantially reduces the stresses at any single portion of the lug. Further, the combination of the stem and fingers permits that the stem be bent only sufficiently to position the circumferential extending fingers so that a slight bending of the fingers will position the tips of the fingers adjacent to the cylindrical surface of the roller 14. Thus a bending action is distributed over the stem and then over fingers to position the lug in a retaining position.

In the foregoing description the retaining means extend inwardly so that the inner ring may be mounted last. However, the retaining means or lugs may extend outwardly, as illustrated in FIG. 10. The fingers 45a and 45b on the lug 43 extend circumferentially a slightly greater distance than the fingers on the lugs 30 and 31 in order to accommodate to the greater peripheral spacing of the rollers. The lugs, however, may be of identical structure as the lugs 30 and 31 with the stems 44 being tapered. Most roller bearings are circular in shape. However, the cage may have other shapes and the ring portions may be generally referred to as side members.

The retaining means or lugs are formed as a single piece with the circumferentially extending ring portions or side members, which have greater rigidity and strength to resist the counterforces to the bending of the lugs and thus permit the cage to retain its precisely machined shape.

In addition to the substantial lowering of the stresses in lugs, this construction holds each of the rollers at four points located at the ends or towards the sides of the rollers, thereby substantially reducing the chance that a roller will become cocked or skewed during the final mounting of the outer ring. Further, the mounting of the lug on the circumferential ring portion of the cage rather than on the web portion, as in previous designs, avoids the deflection or distortion of the web portions and, therefore, permits the web portions to be made of a smaller cross section. This reduced cross section permits an additional roller to be added to a cage of the same circumferential length. The additional roller increases the load carrying capacity of the finished bearing.

Another important feature of this construction is that the lugs are accessible from the sides of the cage for bending by a mandrel with the opposing mandrels applying the forces only through the cage rather than through the cage and the ring to the fixture holding means for the ring. This assures a more uniform bending of all of the lugs. Also the amount of force required to bend the lugs is reduced, thereby further reducing strains on the cage parts. The supporting of the lugs on the ring portion permits inspection of the lugs on the outer surfaces 38 and 39 where the metal of the lug is being stretched and cracks will appear if the lug has been over-stressed. This avoids the shipment of bearings which may ultimately fail in actual service thereby increasing product reliability.

The invention is defined in the appended claims.

I claim:

1. A roller bearing cage comprising two circumferentially extending ring portions longitudinally spaced and having web portions extending therebetween, said web portions being uniformly spaced circumferentially to form a plurality of apertures for receiving roller bearings, circumferentially aligned lugs mounted on said ring portions at opposite ends of each of said web portions, said lugs having generally planar stems extending radially from said ring portions in a plane at a slight angle normal to the axis of the cage and having fingers projecting from opposite edges of said stem at the ends thereof, said fingers extending generally circumferentially and said stems and fingers bent over said web portions and said apertures to retain rollers therein.

2. A roller bearing cage as set forth in claim 1 wherein said stems are tapered in thickness towards the fingers and said fingers are tapered in width.

3. A roller bearing cage as set forth in claim 1 wherein said lugs extend inwardly for retaining rollers without a supporting inner ring.

4. A roller bearing cage as set forth in claim 1 wherein said lugs extend outwardly for retaining rollers without the support of an outer ring.

5. A roller bearing cage comprising spaced side members extending parallel to one another, parallel web portions extending between said side members and evenly spaced to form roller receiving apertures therewith, retaining means adjacent the ends of said web portions and rigidly attached thereto, said retaining means being axially thin and circumferentially aligned in the plane generally normal to the axis of the cage and extending generally normal to said side members and being bent over said web portions and having tip portions on opposite edges of said retaining means and extending longitudinally to the side members and spaced therefrom and curved to extend over said apertures to retain rollers int he cage.

6. A roller bearing cage comprising spaced side members extending parallel to one another, parallel web portions extending between said side members and evenly spaced to form roller receiving apertures therewith, retaining means adjacent the ends of said web portions and rigidly attached thereto, said retaining means being axially thin and circumferentially aligned in a plane normal to the axis of said cage for subsequent deflection over said web portions and having tip portions on opposite edges of said retaining means in the plane of said retaining means, said tip portions extending clear of said apertures for insertion of rollers therein and for subsequent deflection to extend over said aperture to retain rollers therein.

References Cited by the Examiner

UNITED STATES PATENTS

| | | | |
|---|---|---|---|
| 603,869 | 5/1898 | Bauer | 308—217 |
| 1,609,618 | 12/1926 | Gallagher et al. | 308—217 |
| 1,871,150 | 8/1932 | Brown | 308—217 |
| 2,950,151 | 8/1960 | Clark et al. | 308—217 |

DAVID J. WILLIAMOWSKY, *Primary Examiner.*

FRANK SUSKO, *Examiner.*